United States Patent
Rao et al.

(10) Patent No.: US 7,144,563 B2
(45) Date of Patent: Dec. 5, 2006

(54) SYNTHESIS OF BRANCHED CARBON NANOTUBES

(75) Inventors: Apparao M. Rao, Anderson, SC (US); Nicholas W. Gothard, Central, SC (US); Jay B. Gaillard, Clemson, SC (US)

(73) Assignee: Clemson University, Clemson, SC (US)

( * ) Notice: Subject to any disclaimer, the term of this patent is extended or adjusted under 35 U.S.C. 154(b) by 176 days.

(21) Appl. No.: 10/829,660

(22) Filed: Apr. 22, 2004

(65) Prior Publication Data

US 2005/0238566 A1    Oct. 27, 2005

(51) Int. Cl.
  *D01F 9/127*    (2006.01)
  *C01B 31/02*    (2006.01)
  *B01J 21/06*    (2006.01)
  *B01J 23/745*   (2006.01)

(52) U.S. Cl. .................. 423/447.3; 502/349; 502/350; 502/338

(58) Field of Classification Search ............. 423/447.3; 502/338, 349–350
See application file for complete search history.

(56) References Cited

U.S. PATENT DOCUMENTS

| | | | |
|---|---|---|---|
| 4,816,289 A * | 3/1989 | Komatsu et al. | 423/447.3 |
| 5,618,875 A * | 4/1997 | Baker et al. | 524/495 |
| 5,872,422 A | 2/1999 | Xu et al. | |
| 6,221,330 B1 | 4/2001 | Moy et al. | |
| 6,297,063 B1 | 10/2001 | Brown et al. | |
| 6,325,909 B1 | 12/2001 | Li et al. | |
| 6,333,016 B1 | 12/2001 | Resasco et al. | |
| 6,350,488 B1 | 2/2002 | Lee et al. | |
| 6,361,861 B1 | 3/2002 | Gao et al. | |
| 6,451,175 B1 | 9/2002 | Lal | |
| 6,495,258 B1 | 12/2002 | Chen et al. | |
| 6,555,945 B1 | 4/2003 | Baughman et al. | |
| 6,596,187 B1 | 7/2003 | Coll et al. | |
| 6,605,266 B1 | 8/2003 | Nesper et al. | |
| 6,709,566 B1 | 3/2004 | Cumings et al. | |
| 6,869,581 B1 | 3/2005 | Kishi et al. | |
| 2002/0102353 A1 | 8/2002 | Mauthner et al. | |
| 2002/0127170 A1* | 9/2002 | Hong et al. | 423/447.3 |
| 2002/0172639 A1 | 11/2002 | Horiuchi et al. | |
| 2002/0179564 A1 | 12/2002 | Geobegan et al. | |
| 2003/0004058 A1 | 1/2003 | Li et al. | |
| 2003/0089899 A1 | 5/2003 | Lieber et al. | |

(Continued)

OTHER PUBLICATIONS

Article—*Branching carbon nanotubes deposited in HFCVC system*, Bo Gan, J. Ahn, Qing Zhang, S. F. Yoon, Rusli, Q.-F. Huang, H. Yang, M.-B. Yu, and W.-Z. Li, Diamond and Related Materials, vol. 9, 2000, pp. 897-900.

(Continued)

*Primary Examiner*—Stuart Hendrickson
*Assistant Examiner*—Alvin T Raetzsch
(74) *Attorney, Agent, or Firm*—Dority & Manning, P.A.

(57) ABSTRACT

The present invention discloses a relatively simple CVD method for forming branched carbon nanotubes. In general, the method includes adding a dopant to the precursor materials. The dopant can be a material that has a thermodynamically more favorable carbide-forming reaction at the reactor conditions than does the catalyst that is provided to the reactor by a second precursor material. The doped nanoparticles formed in the reactor can adhere to the walls of the developing nanotubes and provide a nucleation site for the development of one or more branches on the nanotube. The nanotubes formed according to the invention can be recognized as such due to the presence of the doped nanoparticles adhered along the walls of the branched nanotubes.

22 Claims, 8 Drawing Sheets

U.S. PATENT DOCUMENTS

2003/0118727 A1  6/2003  Ting et al.
2004/0101685 A1  5/2004  Fan et al.

OTHER PUBLICATIONS

Article—*Complex branching phenomena in the growth of carbon nanotubes*, Dan Zhou and Supapan Seraphin, Chemical Physics Letters, vol. 238, Jun. 2, 1995, pp. 286-289.

Article—*Controlled Growth of Y-Junction Nanotubes Using Ti-Doped Vapor Catalyst*, N. Gothard, C. Daraio, J. Gaillard, R. Zidan, S. Jin, and A. M. Rao, Nano Letters, vol. 0, No. 0, pp. A-E.

Article—*Electronic Transport in Y-Junction Carbon Nanotubes*, C. Papadopoulos, A. Rakitin, J. Li, A. S. Vedeneev, and J. M. Xu, Physical Review Letters, vol. 85, No. 16, Oct. 16, 2000, pp. 3476-3479.

Article—*Growing Y-junction carbon nanotubes*, Jing Li, Chris Papadopoulos, and Jimmy Xu, Nature, vol. 402, Nov. 18, 1999, pp. 253-254.

Article—*Straight carbon nanotube Y junctions*, W. Z. Li, J. G. Wen, and Z. F. Ren, Applied Physics Letters, vol. 79, No. 12, Sep. 17, 2001, pp. 1879-1881.

Article—*Synthetic Strategies for Y-junction carbon nanotubes*, F. L. Deepak, A. Govindaraj, and C. N. R. Rao, Chemical Physics Letters, vol. 345, Sep. 7, 2001, pp. 5-10.

Article—*Y-junction carbon nanotubes*, B. C. Satishkumar, P. John Thomas, A. Govindaraj, and C. N. R. Rao, Applied Physics Letters, vol. 77 No. 16, Oct. 16, 2000, pp. 2530-2532.

Article—*Adjustable boron carbonitride nanotubes*, Zhi et al., Journal of Applied Physics, vol. 91. No. 8, Apr. 15, 2002, pp. 5325-5333.

U.S. Appl. No. 11/134,052, filed May 20, 2005, Kesker et al, Process for Preparing Carbon Nanostructures with Tailored Properties and Products Utilizing Same.

\* cited by examiner

SYNTHESIS OF BRANCHED CARBON NANOTUBES

FEDERALLY SPONSORED RESEARCH AND DEVELOPMENT

The United States Government may have rights in this invention pursuant to National Science Foundation Grant No. NSF NIRT 0304019, NSF 0132573, and NSF ERC EEC-9731680.

BACKGROUND OF THE INVENTION

Advances in technologies associated with electrical circuitry have led to great improvements in many fields. For example, the miniaturization of transistors has enabled computational speeds and data storage capacities for computers considered impossible only a few years ago.

The field of nanotechnology, involving materials formed and utilized on a nanometer scale, has developed over the last several years as the next step in the ongoing attempt to further miniaturize materials. Some of the most exciting materials to be discovered in the field of nanotechnology are single-walled and multi-walled carbon nanotubes. Carbon nanotubes exhibit many desirable properties including high tensile strength, high surface area, light weight per unit length, and the capacity to conduct very high current densities, exceeding $10^7$ A/cm$^2$. In particular, the electron transport properties of carbon nanotubes make them excellent candidates for incorporation into nanoscale circuit devices.

Current theories suggest that three-terminal Y-junction nanotubes can exhibit the gating behavior characteristic of traditional transistors. As such, methods of forming Y-junction nanotubes have been devised. Presently known methods present many problems, however. For example, Li, et al. (U.S. Pat. No. 6,325,909) disclose a method including the formation of an alumina template defining branched channels, growth of nanotubes in the channels via pyrolysis of acetylene using cobalt catalysis, and destruction of the template with acid to recover the branched nanotubes. This is a very detailed and time-consuming process, however, that can take as long as a week to complete. In addition, there exists the danger that the product nanotubes can be damaged in the process of destroying the template.

According to another proposed method for forming Y-branched nanotubes, disclosed by Satishkumar, et al. ("Y-junction Carbon Nanotubes," *Applied Physics Letters*, 77(16), 2530 (2000)), networks of multi-walled nanotubes with random and frequent branches are synthesized via pyrolysis of metallocene/thiophene vapors. The process affords little or no control over the branching mechanism, however, and the products appear to have a high ratio of nanotubes with branching stubs, rather than true Y-junctions that could be used in electrical applications.

One additional method, disclosed by Li, et al. ("Straight Carbon Nanotube Y Junctions," *Applied Physics Letters*, 79(12), 1879 (2001)), describes a process including the pyrolysis of methane over MgO-supported cobalt catalysts. The catalysts are prepared by dissolving Co(NO$_3$)$_2$.6H$_2$O in ethanol and then immersing MgO powder in the solution and sonicating. The mixture is then calcined for about 14 hours and reduced at 1000° C. for one hour under hydrogen and nitrogen. Replacement of the nitrogen with methane results in the formation of branching nanotubes with fixed angles between each branch. These networks of branched nanotubes also form a majority of the junctions with two long arms and a third arm that is no more than a branching stub, similar to the products of Satishkumar, et al.

What is needed in the art is a method for producing branched carbon nanotubes such as Y-junction carbon nanotubes that can be easily sized for bulk formation processes. In addition, what is needed in the art is a method for forming branched carbon nanotubes that includes a scheme to control the location and length of the branches formed along the length of the nanotubes.

SUMMARY OF THE INVENTION

The present invention is directed to a chemical-vapor deposition (CVD) method for forming branched carbon nanotubes. For example, the method can include providing precursor materials, mixing the precursor materials together, vaporizing the precursor materials and then heating the vaporized precursors to suitable CVD reaction conditions along with a vaporized carbon source to form branched carbon nanotubes according to a CVD process. In particular, the precursor materials can include a metallic catalyst source and a dopant source.

Both the metallic catalyst and the dopant can be materials capable of reacting with carbon to form a carbide. In particular, the carbide-forming reaction of the dopant can be more thermodynamically favorable at the reaction conditions than the carbide-forming reaction of the metallic catalyst. In one embodiment, the metallic catalyst can be iron, which can be provided to the process in the form of, for instance, ferrocene. Other metal catalysts can similarly be provided to the process in the metallocene, if desired.

In one embodiment, the metallic catalyst can be provided to the reactor at less than about 0.75 at. %. For example, the metallic catalyst can be provided to the reactor at between about 0.2 at. % and about 0.7 at. %.

In one embodiment, the dopant can be titanium, hafnium, or zirconium. For instance, the dopant can be titanium provided to the reactor in the form of tetrakis(diethylamino) titanium. In one embodiment, the dopant can be provided to the reactor at between about 0.5 at. % and about 4 at. %. For example, the dopant can be provided to the reactor at between about 1 at. % and about 3.5 at. %.

If desired, the carbon source can be an organic solvent that can also be utilized to form a solution of precursors. Organic solvents suitable for the process can include, for example, xylene, ethylene, or benzene. The carbon source is not limited to organic solvents, however, for example, in another embodiment, the carbon source can be methane.

The precursor materials can be mixed together either before entering the reactor or after, as desired, and the precursor materials can be vaporized either internal or external to the reactor, as desired. For instance, the precursor materials can be vaporized at a temperature of less than about 200° C. In one embodiment, the precursor materials can be vaporized at a temperature of between about 125° C. and about 175° C.

The vaporized precursor materials and the carbon source can be heated to a reaction temperature in a reactor, and the branched nanotubes can spontaneously form via a CVD process. For example, the reaction temperature can be between about 650° C. and about 850° C.

According to various embodiments of the disclosed invention, the carbon source can be provided to the reactor either simultaneously with or subsequent to the mixture of precursors. If the carbon source is provided with the mixture of precursors, branches can form at the same time as a nanotube grows longitudinally. If the carbon source is provided subsequent to the mixture of precursors, the nascent branches can grow longitudinally from the branch junctions without the formation of additional branches along the nanotube during longitudinal growth.

The present invention is also directed to the branched carbon nanotubes formed according to the disclosed processes. In particular, the branched carbon nanotubes of the present invention can have doped nanoparticles attached to the walls thereof. The doped nanoparticles can include a first carbide-forming material (e.g., iron) doped by a second carbide-forming material such as titanium, zirconium, or hafnium, for example. In general, the doped nanoparticles attached to the walls of the branched nanotubes can include less than about 5 at. % dopant.

The branched carbon nanotubes can have various different morphologies. For example, the branched nanotubes can include either a single or alternatively more than one branch emanating from a single branch junction. Additionally, the branched nanotubes can include branches along the length of the carbon nanotube, that is, they can include multiple branching loci along the length of the nanotube. Moreover, in one embodiment, the branched nanotubes can include a branch junction at the base, in effect forming a V-branched nanotube.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
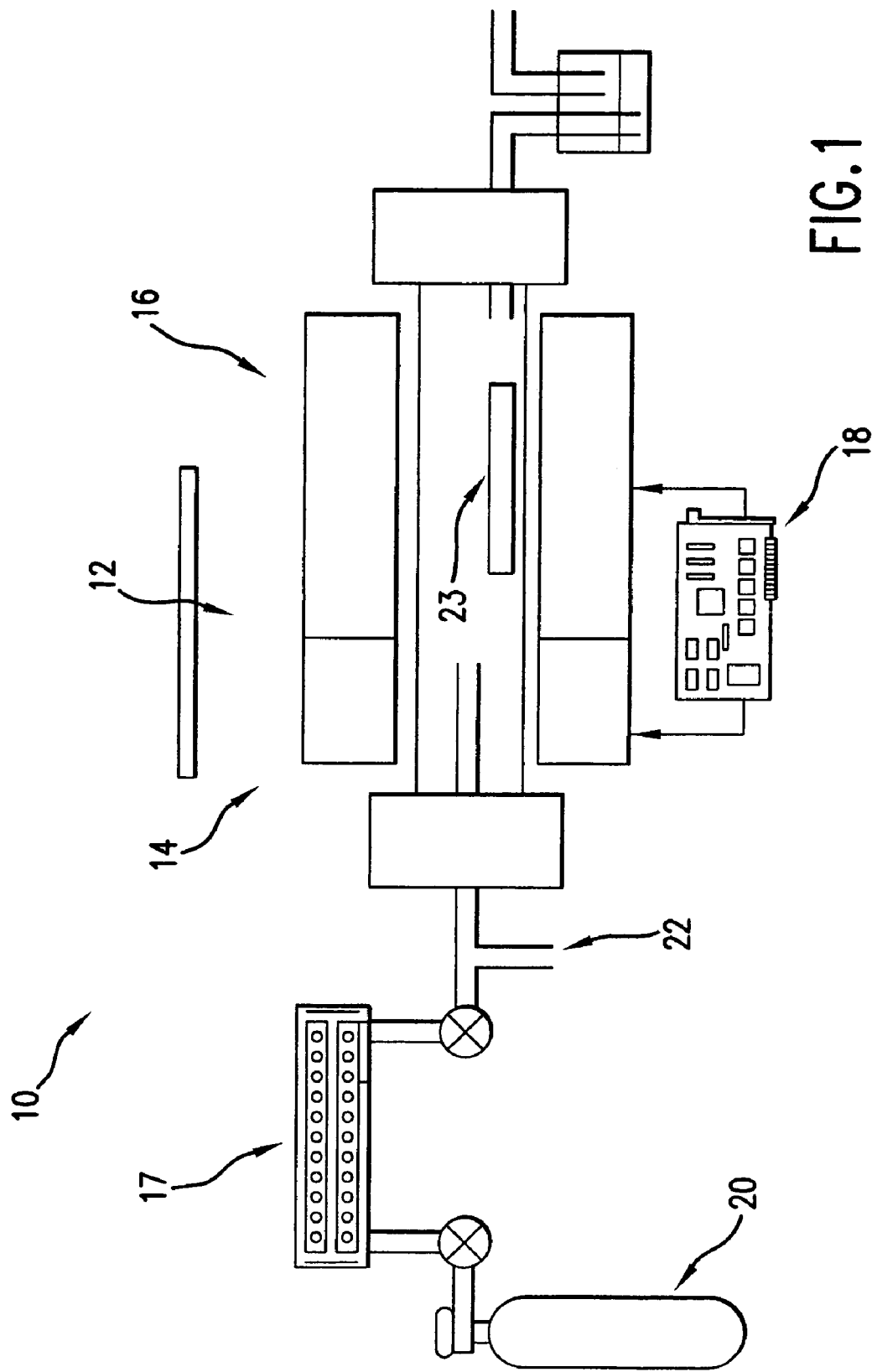
FIG. 1 is a schematic diagram of one embodiment of a reactor that can be utilized in the disclosed process.

Repeat use of reference characters in the present specification and drawings is intended to represent the same or analogous features or elements of the present invention.

DETAILED DESCRIPTION OF THE INVENTION

Reference will now be made in detail to various embodiments of the invention, one or more examples of which are set forth below. Each embodiment is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment may be used in another embodiment to yield a still further embodiment. Thus, it is intended that the present invention cover such modifications and variations as come within the scope of the appended claims and their equivalents.

The present invention is generally directed to a method for forming branched carbon nanotubes and the branched nanotubes formed according to the disclosed process. More specifically, the disclosed method is a chemical-vapor deposition (CVD) method in which a carbide-forming dopant is included in the precursor materials fed to the reactor. The presence of the carbide-forming dopant in the precursor materials can lead to the formation of nucleation sites or branching loci along the walls of the nascent nanotubes, and nanotube branches can develop and grow from the nucleation sites. Each branch can then continue to grow independently as long as a carbon source remains available at reaction conditions. As such, according to the presently disclosed processes, branched nanotubes can be formed in which not only can the location of the branches along the length of the nanotubes be controlled, but the length of the branches extending from the point of initial formation can also be controlled.

The disclosed process can be utilized in any CVD carbon nanotube formation process. For instance, while CVD processes are often used in forming multi-walled carbon nanotubes, it should be understood that the disclosed process is not limited to the formation of multi-walled carbon nanotubes and can, in some embodiments, be utilized to form branched single-walled carbon nanotubes.

FIG. 1 illustrates one embodiment of a system generally 10 that can be utilized in the disclosed process. System 10 can be used to grow highly aligned and high purity nanotubes according to the disclosed CVD process. In this particular embodiment, system 10 can include a two-stage furnace 12 that can be controlled such as by temperature controller 18 to provide a preheater 14 and a reactor 16 within the furnace 12. Optionally, the preheater 14 and the reactor 16 can be independent heating zones within a single furnace, or two separate furnaces, i.e., a first preheater furnace and a second reactor furnace. Other standard process control measures and devices as are generally known in the art, such as mass flow controller 17, for example, can be included with the system 10 to control the process either manually or automatically.

An inert gas flow can be supplied to the system 10, such as via tank 20, to provide a carrier flow for materials into the furnace 12. In one embodiment, the inert carrier gas can be argon, though this is not a requirement of the present invention. Optionally, the carrier gas can include additional materials. For example, in one embodiment, the carrier gas can include hydrogen, which has been shown to enhance the production of the nanotubes while minimizing build-up of amorphous carbon within the reactor 16.

The system 10 can also include a port 22 for inserting materials into the system 10. In one embodiment, the port 22 can be an injection port for injecting liquid materials into the system 10. Optionally, the port 22 can deliver precursor materials into the carrier gas flow upstream of the furnace 12, e.g., gaseous precursor materials, or alternatively, one or more materials can be delivered directly into the preheater 14, as is often the case with liquid precursor materials.

The materials fed to the system can include a carbon source, which is generally a hydrocarbon that can, upon decomposition in the furnace, provide the elemental carbon for formation of the nanotubes. For example, in one embodiment, the carbon-containing precursor material can be xylene, ethylene, acetylene, methane, or benzene. The carbon source need not be limited to a hydrocarbon, however, and can be any suitable carbon-containing material that can decompose in the furnace to provide the elemental carbon necessary for growth of the developing nanotubes.

According to one particular embodiment of the present invention, the carbon source can be an organic solvent that can also serve as a solvent for one or more of the other precursor materials. According to this embodiment, a precursor material can be dissolved in the organic solvent and the liquid solution containing both can be injected into the system such as via port 22. This is not a requirement of the present invention, however.

Optionally, dissolution of the precursor materials in an organic solvent can be facilitated by sonication of the mixture. For example, one or more precursor materials can be combined in an organic solvent and the mixture can then be sonicated in a warm water bath to facilitate dissolution of any solid precursor materials and form a solution for injection into the system 10.

The precursor materials fed to the system 10 can also include a component that contains a catalyst necessary for initial nucleation of the nanotubes and nucleation of the nanotube branches. Similar to the carbon source, the catalyst-containing precursor material can be any suitable material that can provide the catalyst necessary to initiate nanotube formation in the reactor. For example, metallic catalysts such as iron, cobalt, nickel, etc., can be utilized in the reactor to initiate formation of the nanotubes and the branches. In general, the catalyst can be a carbide-forming metal atom. In one particular embodiment, the catalyst-containing precursor material can be a metallocene, for instance ferrocene, cobaltocene, nickelocene, and the like, though other catalyst-containing precursor materials as are generally known in the art are also encompassed by the invention.

Beneficially, in one embodiment of the present invention, a metallic catalyst can be provided to the reactor at levels lower than those of many previously known similar CVD processes. For example, according to some embodiments, a metallic catalyst can be supplied to the reactor at an atomic percentage of between about 0.2 at. % and about 0.7 at. %. For purposes of this disclosure, when considering the atomic percentage (at. %) of a material provided to the reactor, the atomic percentage of that material can be defined as the ratio of the number of moles of that material to the total number of moles of all of the reactive materials provided to the reactor. In particular, the reactive materials provided to the reactor can include all of the elemental carbon fed to the reactor, no matter what the source, as well as any catalyst(s) and dopant(s) fed to the reactor. It has been found that in some embodiments, by utilizing lower atomic percentages of metallic catalyst than was generally utilized in the past, the catalyst-containing precursor material can exhibit improved dissolution characteristics in an organic solvent. In addition, at lower concentration levels, the tendency of the catalyst-containing precursor material to precipitate out of solution during the process can be prevented.

Of course, in other embodiments, a metallic catalyst can be provided to the system at higher concentrations. For example, a metallic catalyst can optionally be provided to the reactor at concentrations greater than about 0.7 at. %, such as at about 0.75 at. %, or even higher, in some embodiments.

According to the present invention, in addition to the standard carbon source and catalyst-containing precursor discussed above, an additional precursor material including a dopant can be provided to the reactor during the process. In particular, the dopant can be a carbide-forming material in which the carbide-forming reaction of the dopant is more thermodynamically favorable than the carbide-forming reaction of the catalyst at reaction conditions.

For example, in one particular embodiment, the metallic catalyst can be iron. Table 1, below, presents values for the change in Gibbs free energy for several carbide forming reactions at 1000 K (about 727° C.) and atmospheric pressure. As can be seen, at these conditions, all of the materials listed have a change in Gibbs free energy for the formation of the carbide that is less than the change in Gibbs free energy for the iron carbide formation reaction. As such, according to the present invention, any of the below-listed materials can be provided to the reactor and utilized as a dopant in an iron catalyzed branched nanotube formation process. Of course, the efficiency of the different dopants can vary. That is, the percentage of nanotubes formed exhibiting branching can be greater when utilizing a more efficient dopant. For example, it is believed that hafnium, with a $\Delta G_f$ of −25.141 Kcal/g-atom would be more efficient in forming branched nanotubes in an iron catalyzed process than would molybdinum, with a $\Delta G_f$ of −4.086 Kcal/g-atom.

TABLE 1

| Reaction | Gibbs Free Energy (Kcal/g-atom) |
|---|---|
| $3Fe + C \rightarrow Fe_3C$ | 0.075 |
| $Ti + C \rightarrow TiC$ | −20.730 |
| $Zr + C \rightarrow ZrC$ | −22.320 |
| $Hf + C \rightarrow HfC$ | −25.141 |
| $V + C \rightarrow VC$ | −12.193 |
| $Nb + C \rightarrow NbC$ | −16.248 |
| $Ta + C \rightarrow TaC$ | −17.361 |
| $3Cr + 2C \rightarrow Cr_3C_2$ | −5.727 |
| $2Mo + C \rightarrow Mo_2C$ | −4.086 |
| $W + C \rightarrow WC$ | −4.295 |

Similar to the other precursor materials, the dopant can be supplied to the reactor 16 in any suitable form, i.e., in a form that can provide the elemental dopant in the reactor. For example, in one embodiment, the dopant can be titanium and can be provided to the reactor as tetrakis(diethylamino) titanium ($C_{16}H_{40}N_4Ti$). A non-limiting list of other possible dopant-containing precursor materials suitable for the present invention can include tetrakis(diethylamino) zirconium ($C_{16}H_{40}N_4Zr$) and tetrakis(ethylmethylamino) hafnium ($C_{12}H_{32}HfN_4$).

In one embodiment, the dopant can be supplied to the reactor with the metallic catalyst at an atomic concentration of between about 0.5 at. % and about 4 at. % and branched nanotubes can spontaneously form in the reactor. In one embodiment, the dopant can be supplied to the reactor at a concentration of between about 1 at. % and about 3.5 at. %. For example, the dopant can be supplied to the reactor at between about 1 at. % and about 3 at. %.

Referring again to FIG. 1, according to this particular embodiment, the precursor materials can be provided to the preheater 14, either together or separately, as desired, where they can be mixed, heated, vaporized and carried on to the reactor 16. In general, the preheater 14 can be heated to a temperature that is equivalent to or even less than preheat temperatures generally known in the art. For example, according to certain embodiments of the present invention, the preheater 14 can be heated to a temperature of about 250° C. In other embodiments, however, a lower temperature can be used in the preheater 14. In certain embodiments of the invention, a lower temperature in the preheater 14 has been found to reduce or eliminate problems associated with the precipitation of one or more of the precursor materials out of solution. According to this particular embodiment, the preheater 14 can be heated to a temperature of less than about 200° C. For instance, the preheater 14 can be heated to between about 125° C. and about 190° C. In one embodiment, the preheater 14 can be heated to between about 125° C. and about 175° C. In one particular embodiment of the present invention, the process temperature of the preheater 14 can be about 150° C.

The conditions in the reactor during the disclosed processes can generally be equivalent to those of other CVD nanotube formation processes as are known in the art. For example, reactor 16 can be heated to a temperature between about 650° C. and about 850° C. according to one embodiment of the disclosed invention. For instance, the reactor 16 can be heated to a temperature between about 700° C. and about 850° C. In one embodiment, the reactor 16 can be heated to a temperature between about 650° C. and about 750° C. In one particular embodiment, the reactor 16 can be heated to a temperature of about 750° C. Within the reactor 16, nanotubes can grow spontaneously in highly ordered arrays on a substrate 23, for instance a quartz substrate 23, or any other suitable substrate material as is generally known in the art.

According to the present invention, when the dopant is provided to the reactor 16 along with the metallic catalyst, branches can spontaneously form on the developing nanotubes. Moreover, branches will continue to form on the nanotubes as long as the dopant is provided to the reactor 16 with the catalyst. Upon cessation of flow of either the catalyst or the dopant, however, additional branches will not form, but the branched nanotubes already formed can continue to grow as long as the carbon is supplied at reaction conditions.

While not wishing to be bound by any particular theory, it is believed that upon combination of the dopant with the catalyst, the dopant can dissolve in the catalyst and can form doped catalytic nanoparticles within the reactor. In particular, a catalytic particle of a doped metallic material can be formed that is more thermodynamically favorable toward carbide formation than is the pure metallic catalyst. Due to the more favorable carbide formation properties of the doped material, the doped nanoparticle can become attached to the wall of developing carbon nanotube and can form a nucleation site for a branch on the developing nanotube.

Figure 2:
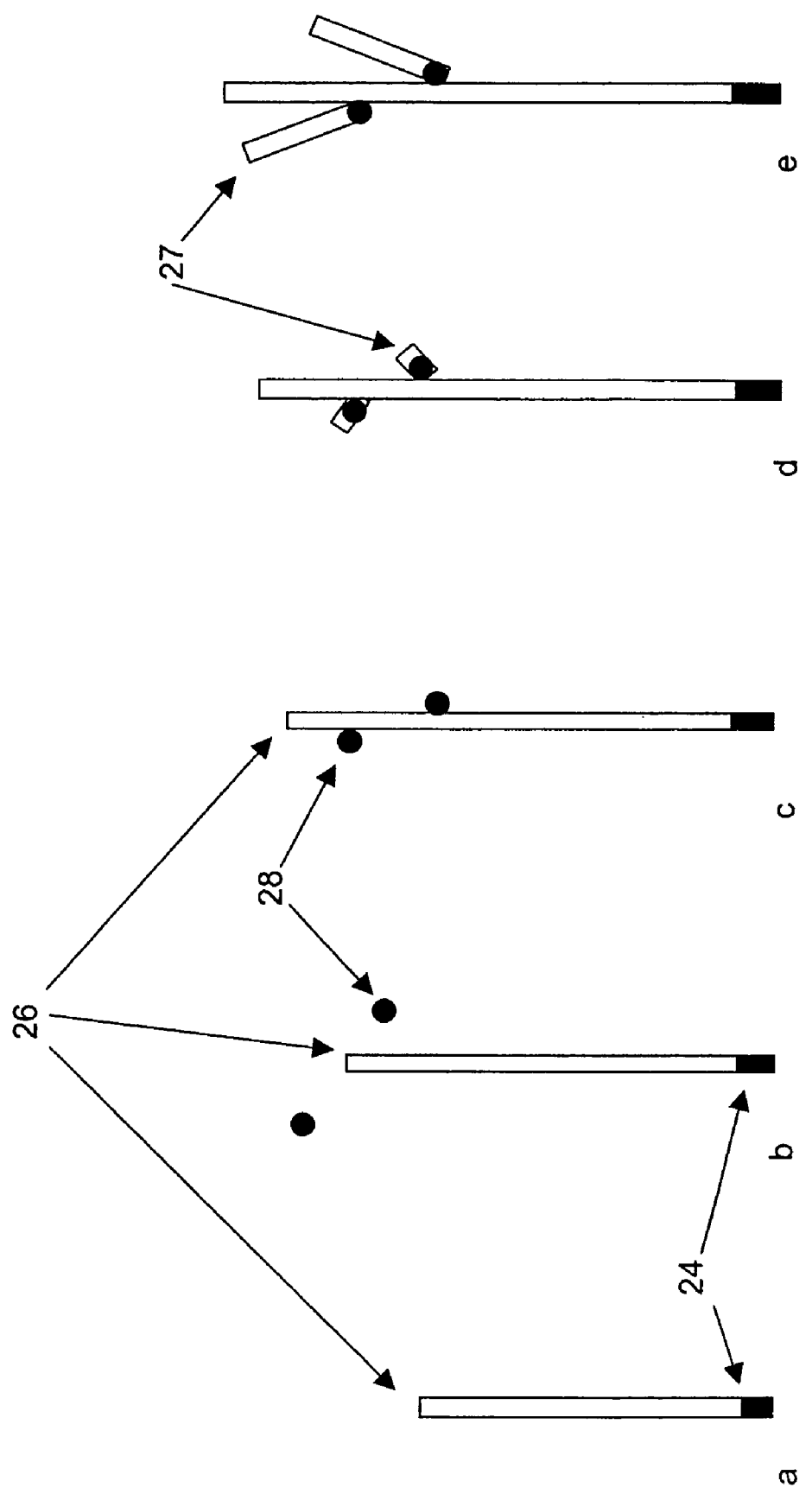
FIG. 2 is a schematic illustration of a branched carbon nanotube growth model for the process of the present invention.
Figure 3:
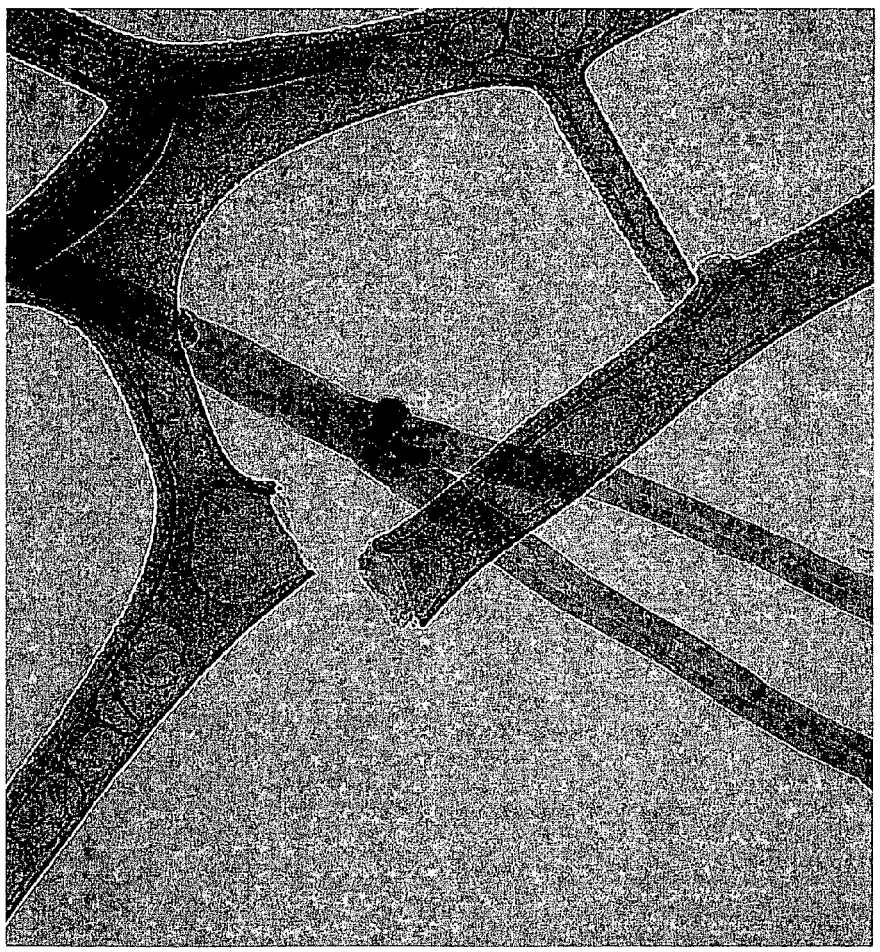
FIGS. 3–8 are TEM images of branched multi-walled nanotubes (MWNTs) of the present invention.
Figure 4:
Figure 5:
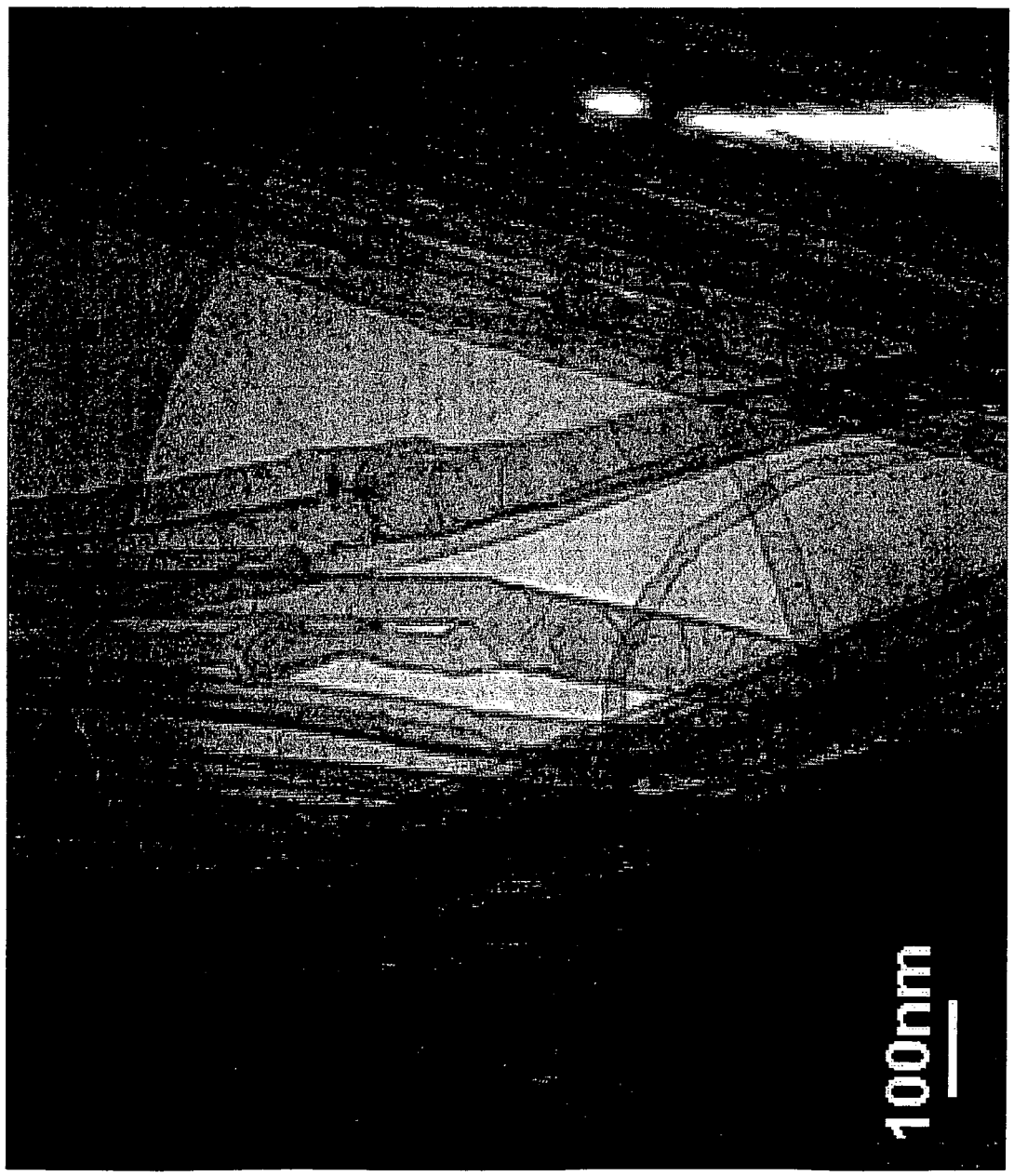
Figure 6:
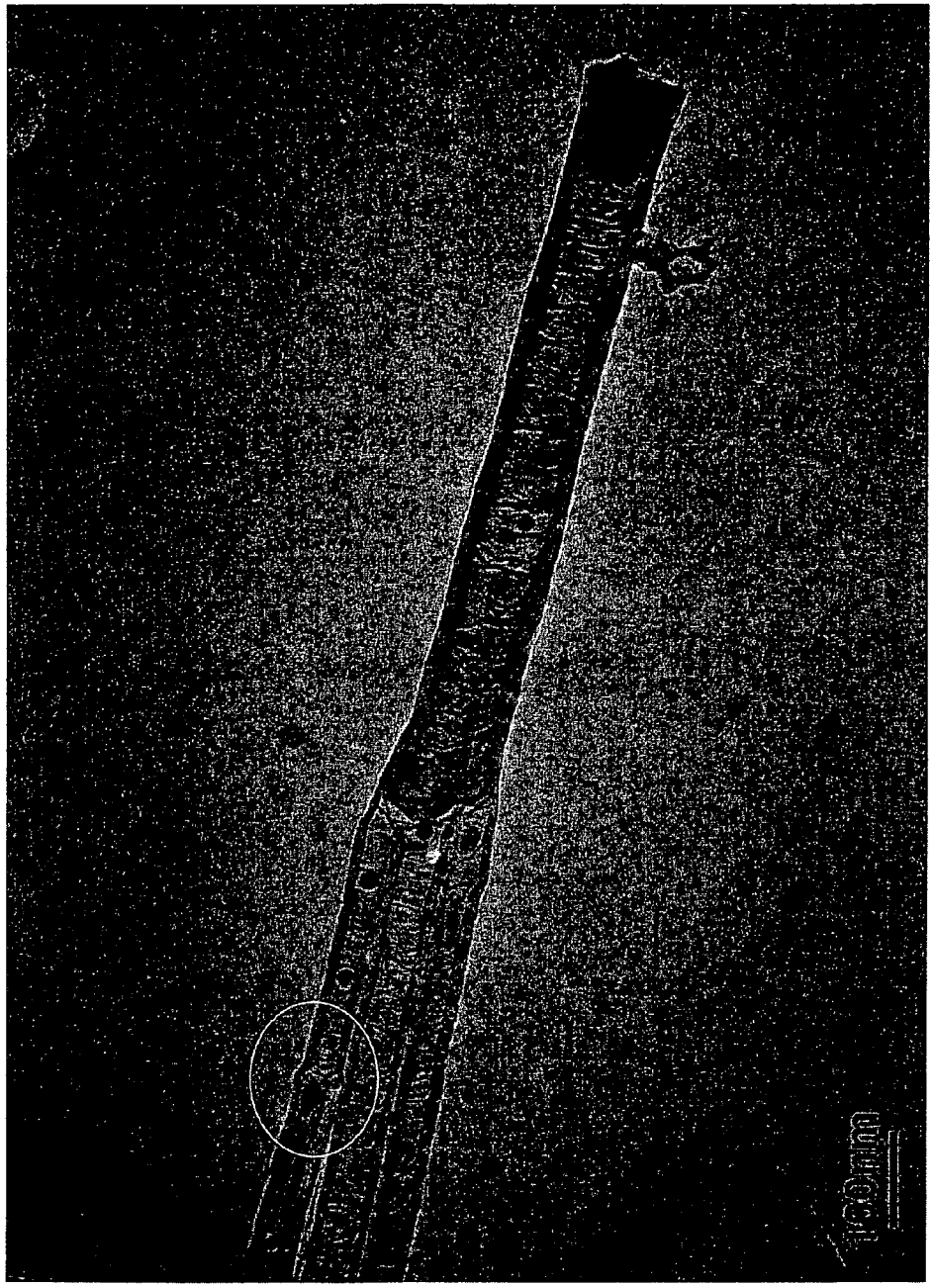
Figure 7:
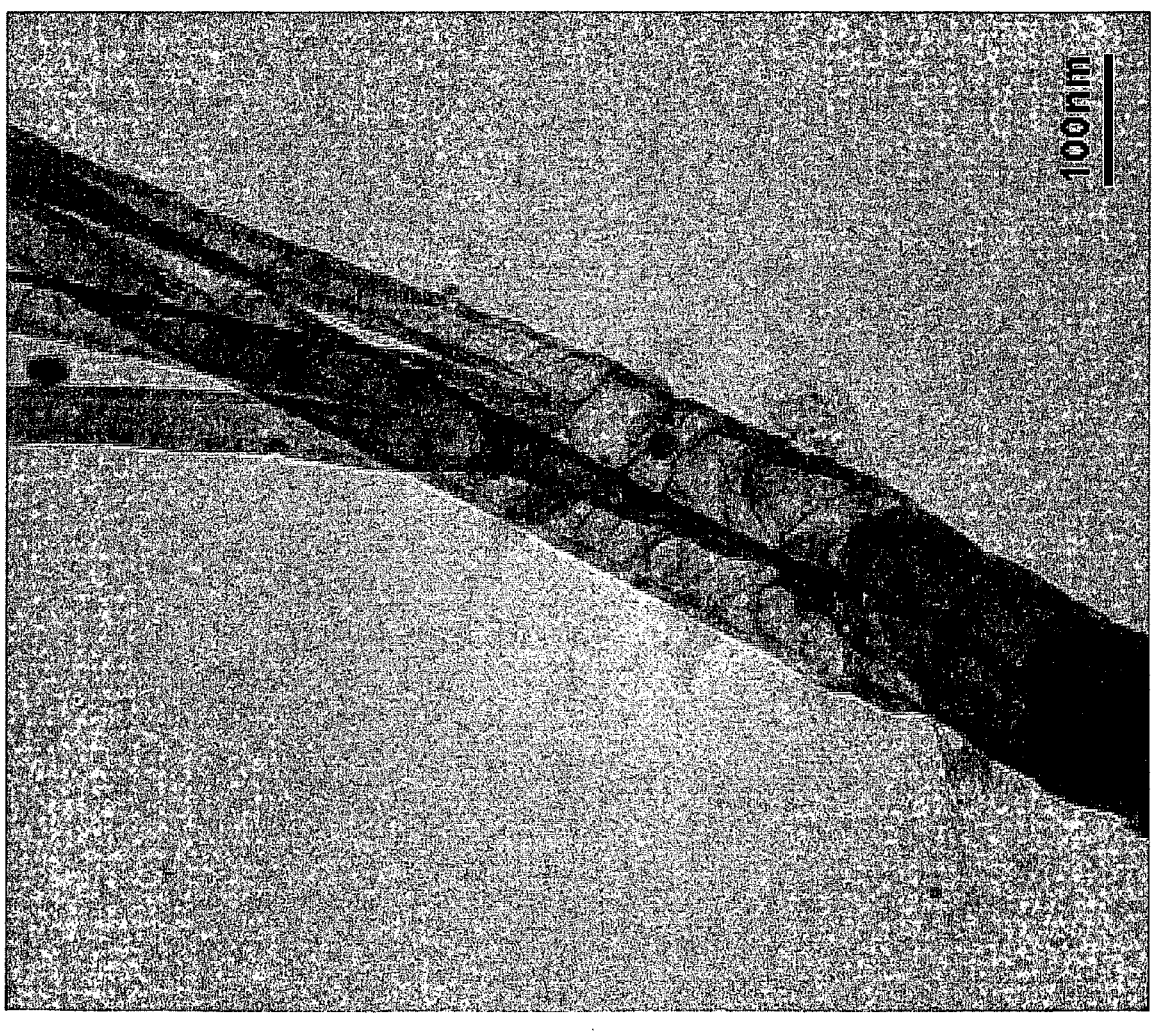

This growth model for the process of the present invention is schematically illustrated in FIGS. 2*a*–2*e*. At FIG. 2*a* can be seen a developing nanotube 26 initially nucleated at 24 and developing according to a root growth method, that is, a growth method in which carbon is absorbed at the root and then ejected in the form of a vertically aligned nanotube. At FIG. 2*b* a supply of doped catalyst particles 28 are supplied to the reactor. Due to the favorable carbide forming thermodynamic characteristics of the doped particles 28, the particles 28 can become attached to the growing nanotube wall, as shown at FIG. 2*c*. Nucleation of nanotube material (carbon) can then occur around the attached catalyst particle (FIG. 2*d*). Nanotube branches 27 begin to grow from the junction upon supply of the nanotube material to the system, and the branched nanotube can continue to develop, as shown at FIG. 2*e*.

According to one embodiment of the present invention, the location of branches along the length of the nanotubes can be controlled by controlling the content of the precursor mixture that is fed to the reactor 16. More specifically, following initial nucleation of the nanotubes in the reactor 16, the nanotubes can continue to grow as long as carbon is supplied at reaction conditions. Decrease of the carbon flow rate in the reactor can slow or cease longitudinal growth of the developing nanotubes. In addition, nucleation sites for branches along the developing nanotubes can only form when both the catalyst and the dopant are provided to the reactor together. That is, when the catalyst and the dopant are fed to the reactor together, the doped catalytic nanoparticles can form and can adhere to the nanotube walls at or near the top of the developing nanotube and form a branch junction. Thus, by controlling the content of the flow to the reactor, a control mechanism for the nucleation and formation of branches along the length of the nanotubes can be provided. Specifically, when carbon is available, the nanotubes will continue to grow longitudinally, and when both of the catalyst and the dopant are available branching loci can form at the top of the nanotubes.

It is believed that the doped catalytic nanoparticles can adhere at or near the top of developing nanotubes primarily due to the characteristics of the nanotube mat formed according to a CVD process. More specifically, a CVD process, such as those herein described, can provide a dense, highly ordered array of carbon nanotubes, and as such, the doped nanoparticles can be physically hindered from accessing lower areas of the dense mat of nanotubes. As such, branches can develop at or near the top of existing nanotubes when the combination of dopant and catalyst are provided to the reactor.

Moreover, the flow rates of the various precursor materials can also be manipulated to provide branched nanotubes having specific morphologies. For example, in one embodiment, carbon can be provided to the reactor simultaneous with the dopant/catalyst combination. According to this embodiment, the product nanotubes can form with multiple branch junctions along the length of the nanotube. In an alternative embodiment, the carbon flow rate can be slowed or stopped while the dopant/catalyst mixture is provided and then the carbon flow can be resumed without flow of the dopant/catalyst mixture. According to this embodiment, the nanotubes can develop a single branch junction along the length of the nanotube. Additionally, reactor temperature can affect the morphology of the product nanotubes, for example, nanotubes including multiple branches emanating from a single junction are more likely to form at lower reactor temperatures.

Figure 8:
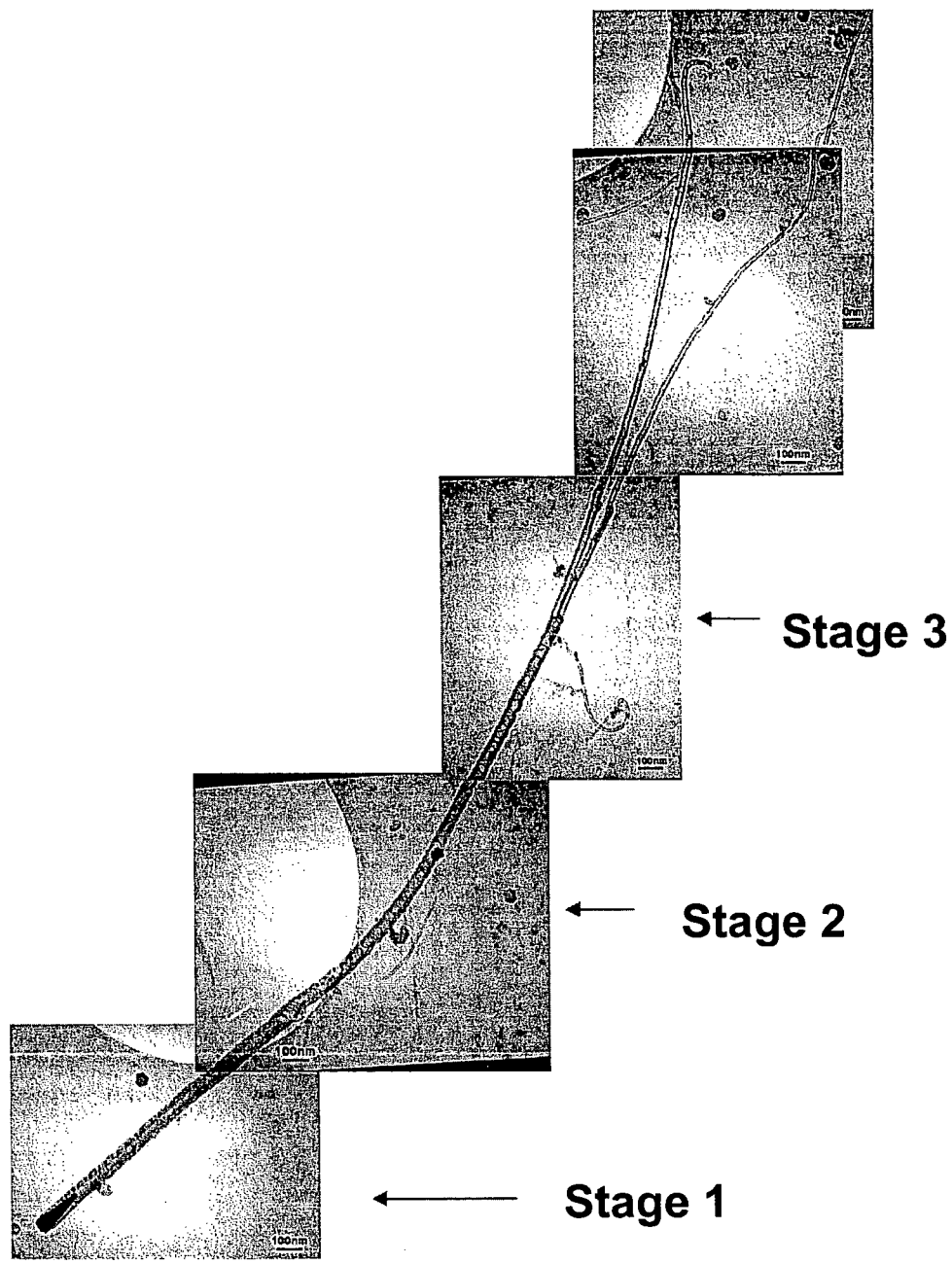

One possible multi-stage growth process can be described as follows: following initial nucleation of the nanotubes on a substrate held in a reactor, the carbon source can be supplied to the reactor with or without one of the dopant-containing precursor or the catalyst-containing precursor, but not with both together. During this stage of development, the nanotubes can develop with no branches. Following this stage, the vapor flow into the reactor can be changed to include both the dopant-containing precursor and the catalyst-containing precursor. Moreover, the flow of the dopanti-catalyst mixture can be initiated simultaneously with a decrease or halt in the flow of the carbon source. During this third stage of development, longitudinal nanotube formation can slow or halt at the same time as the doped catalyst nanoparticles adhere at or near the top of the nanotubes at substantially the same height across the dense mat of nanotubes. Following this stage, the flow of dopant and/or catalyst can be halted and the flow of the carbon source can be increased or resumed. This brings on a final stage of development during which branches can begin to grow from the nucleation sites formed by the attachment of the doped catalyst nanoparticles to the nanotubes. The branches can then grow in length as long as the supply of carbon continues through the reactor. A TEM image of a nanotube formed according to such a multi-stage growth process can be seen in FIG. 8. Optionally, this process can be repeated to produce an array of branched nanotubes with branch junctions occurring at specific heights along the lengths of the nanotubes.

Of course, the doped nanoparticles can also initialize formation of the nanotubes on the substrate. Moreover, according to this particular embodiment, when both the dopant and the catalyst are provided to the reactor for a period of time, generally greater than about five minutes, during initialization of the nanotubes, the nanotubes can be initialized with a junction at the base of the nanotube, i.e., a V-junction nanotube can be formed.

FIGS. 3–8 are TEM images of exemplary branched nanotubes formed according to the presently disclosed processes. As can be seen in the figures, the branched nanotubes of the present invention can include the doped catalyst nanoparticles attached to the formed nanotubes at or near the branch junctions on the nanotubes. For instance, in FIG. 3, the darker doped catalyst nanoparticle is clearly visible attached to the nanotube at the branch junction. As can additionally be seen in the figures, in particular in FIGS. 6 and 7, in some embodiments, the product nanotubes can include the doped nanoparticles attached to the walls of the nanotubes, but at a slight distance from the branching site. While not wishing to be bound by any particular theory, this is believed to be caused either when a branch fails to develop, such as due to inadequate amount of catalyst in the particle or inadequate supply of carbon to the site, or optionally when the doped nanoparticles become dislodged from the original branch junction and are driven up or down the branch during the subsequent nanotube growth. In any case, the branched nanotubes of the present invention can include one or more of the doped catalyst nanoparticles attached to the product nanotubes.

The relative amount of dopant present in the nanoparticles will, of course, depend upon the solubility of the dopant in the catalyst material at the reaction conditions, but in general can be less than about 5 at. % of the nanoparticle. For example, in one particular embodiment, the catalyst can be iron, and the dopant can be titanium. In this particular embodiment, the doped nanoparticles attached to the walls of the product nanotubes can be less than about 2 at. % titanium, and in some embodiments less than about 1 at. % titanium, which is consistent with the solubility of titanium in iron at the disclosed reactor conditions.

The disclosed invention can be better understood with references to the following examples.

EXAMPLE 1

Ferrocene was dissolved into a mixture including xylene and tetrakis (diethylamino) titanium ($C_{16}H_{40}N_4Ti$) at a concentration of 0.7 at. %. Mixtures with varying atomic concentration of Ti (1 to 3 at. %) were injected into the preheater of a system such as that schematically illustrated in FIG. 1. The preheater was maintained at or near 150° C. The liquid mixture was vaporized in the preheater and was carried by a carrier flow of a mixture of argon and hydrogen into the main quartz tube reactor. The temperature in the reactor of the furnace (described as CVD temperature in Table 2) was varied between about 650° C. and about 850° C. Mats of oriented branched multi-walled nanotubes grew spontaneously on quartz substrates placed inside the reactor. Results are summarized in Table 2, below.

TABLE 2

| at. % Ti | at. % Fe | CVD temp. (° C.) | Injection duration (min.) | % MWNTs with branches | morphology |
|---|---|---|---|---|---|
| 3 | 0.7 | 650 | 20 | ~70 | Frequent double branching |
| 3 | 0.7 | 700–750 | 20–60 | ~75–100 | Large amount of Y-junction MWNTs |
| 3 | 0.7 | 800 | 20 | ~50–60 | Irregular and corrugated stems |
| 3 | 0.7 | 850 | 20 | ~10–15 | Branching near base |
| 1 | 0.7 | 750 | 30 | ~25 | Corrugated stems, frequent branching |

FIGS. 3–7 illustrate TEM images of individual nanotubes obtained. Individual nanotubes were harvested from the mats and sonicated in ethanol to disperse them before being dispersed onto TEM grids for characterization.

The corrugations present on the walls of some of the product nanotubes visible, for example, in FIGS. 4–7, was attributed to the presence of nitrogen in the titanium compound, as previous work with nitrogen has shown it efficacious for synthesizing nanotubes with similar structures.

EXAMPLE 2

MWNTs were grown on 12 quartz substrates. Each substrate was assigned a tracking number 1–12. The preheat stage of the furnace was at 150° C. and the reactor stage was at 750° C. for all processes. Initially, all 12 substrates were subjected to a first growth stage consisting of a 5 minute injection of a precursor mixture containing 0.7 at. % Fe and 3 at. % Ti dissolved in xylene. Upon conclusion of this stage, substrates 9–12 were removed from the furnace and placed in a dessicator jar to prevent oxidation.

Following removal of substrates 9–12 from the reactor, substrates 1–8 were subjected to a second growth stage of a 30-minute injection of pure xylene. Following this injection, substrates 1–4 were removed from the furnace and placed in a dessicator jar.

Substrates 5–8 were then subjected to a third growth stage of a 30 minute injection of a solution including 0.7 at. % Fe and 3 at. % Ti in xylene. These substrates were then removed from the reactor.

Substrates 9–12 were later removed from the dessicator jar and returned to the reactor, where they were subjected to a second growth stage of a 30 minute injection of a mixture of 3 at. % Ti in xylene.

A summary of the various growth stages for all of the substrates 1–12 can be seen in Table 3, below.

TABLE 3

| Substrate | First Growth Stage | | Second Growth Stage | | Third Growth Stage | |
|---|---|---|---|---|---|---|
| | at. % Fe/at. % Ti | injection time(min) | at. % Fe/ at. % Ti | injection time(min) | at. % Fe/ at. % Ti | injection time(min) |
| 1 | 0.7/3 | 5 | 0/0 | 30 | | |
| 2 | 0.7/3 | 5 | 0/0 | 30 | | |
| 3 | 0.7/3 | 5 | 0/0 | 30 | | |
| 4 | 0.7/3 | 5 | 0/0 | 30 | | |
| 5 | 0.7/3 | 5 | 0/0 | 30 | 0.7/3 | 30 |
| 6 | 0.7/3 | 5 | 0/0 | 30 | 0.7/3 | 30 |
| 7 | 0.7/3 | 5 | 0/0 | 30 | 0.7/3 | 30 |
| 8 | 0.7/3 | 5 | 0/0 | 30 | 0.7/3 | 30 |
| 9 | 0.7/3 | 5 | 0/3 | 30 | | |
| 10 | 0.7/3 | 5 | 0/3 | 30 | | |
| 11 | 0.7/3 | 5 | 0/3 | 30 | | |
| 12 | 0.7/3 | 5 | 0/3 | 30 | | |

Upon analysis of the product nanotubes, branches were only found on the MWNTs of substrates 5–8. Thus, it is clear that branching only occurs when both the metallic catalyst and the dopant are present in the precursor materials.

It will be appreciated that the foregoing examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

What is claimed is:

1. A chemical-vapor deposition process for forming branched carbon nanotubes comprising:
    providing a first precursor material comprising a catalyst for catalyzing the formation of a carbon nanotube according to a chemical-vapor deposition process, wherein the catalyst is capable of forming a carbide when reacted with carbon;
    providing a second precursor material comprising a dopant, wherein the dopant is capable of forming a carbide when reacted with carbon, wherein the second precursor material is tetrakis(diethylamino)titanium;
    mixing the first and second precursor materials together;
    vaporizing the precursor materials;
    heating the vaporized mixture of precursor materials to a reaction temperature in a reactor, wherein the carbide-forming reaction of the dopant is more thermodynamically favorable than the carbide-forming reaction of the catalyst at the reactor conditions;
    providing a carbon source to the reactor;
    vaporizing the carbon source;
    heating the vaporized carbon source to the reaction temperature in the reactor; and
    forming a carbon nanotube in the reactor according to a chemical-vapor deposition process, wherein the carbon nanotube comprises one or more branches.

2. The process of claim 1, wherein the carbon source is an organic solvent.

3. The process of claim 2, wherein the organic solvent is selected from the group consisting of xylene, ethylene, and benzene.

4. The process of claim 1, wherein the catalyst is iron.

5. The process of claim 1, wherein the first precursor material comprising the catalyst is a mettallocene.

6. The process of claim 1, wherein the catalyst is provided to the reactor at an atomic percentage of less than about 0.75 at. %.

7. The process of claim 1, wherein the catalyst is provided to the reactor at an atomic percentage of between about 0.2 at. % and about 0.7 at. %.

8. The process of claim 1, wherein the dopant is provided to the reactor at an atomic percentage of between about 0.5 at. % and 4 at. %.

9. The process of claim 1, wherein the dopant is provided to the reactor at an atomic percentage of between about 1 at. % and 3.5 at. %.

10. The process of claim 1, wherein one or both of the precursor materials are vaporized at a temperature of less than about 250° C.

11. The process of claim 1, wherein one or both of the precursor materials are vaporized at a temperature of between 125° C. and about 175° C.

12. The process of claim 1, wherein the reaction temperature is between about 650° C. and about 850° C.

13. The process of claim 1, wherein the carbon source is provided to the reactor subsequent to when the vaporized mixture of precursor materials is heated to the reaction temperature.

14. The process of claim 1, wherein the carbon source is provided to the reactor simultaneous with when the vaporized mixture of precursor materials is heated to the reaction temperature.

15. A chemical-vapor deposition process for forming branched nanotubes comprising:
    providing precursor materials including a first precursor material comprising an organic solvent, a second precursor material comprising iron, and a third precursor material comprising a dopant, wherein the dopant is selected from the group consisting of titanium, hafnium, and zirconium;

mixing the precursor materials together;

vaporizing the precursor materials;

heating the vaporized precursor materials to a reaction temperature, wherein the carbide-forming reaction of the dopant is more thermodynamically favorable than an iron carbide forming reaction at the reaction temperature;

forming a bimetal catalyst particle, wherein the two metals of the bimetal catalyst particle are the iron of the second precursor material and the dopant of the third precursor material; and forming a carbon nanotube according to a chemical-vapor deposition process, wherein the carbon nanotube comprises one or more branches.

16. The process of claim 15, wherein the organic solvent is selected from the group consisting of xylene, benzene, and ethylene.

17. The process of claim 15, wherein the precursor material comprising iron is ferrocene.

18. The process of claim 15, wherein iron is provided at an atomic percentage of less than about 0.75 at. %.

19. The process of claim 15, wherein iron is provided at an atomic percentage of between about 0.2 at. % and about 0.7 at. %.

20. The process of claim 15, wherein the dopant is provided at an atomic percentage of between about 0.5 at. % and 4 at. %.

21. The process of claim 15, wherein the mixture of precursor materials is vaporized at a temperature of between 125° C. and about 175° C.

22. The process of claim 15, wherein the reaction temperature is between about 65° C. and about 850° C.

* * * * *

UNITED STATES PATENT AND TRADEMARK OFFICE
CERTIFICATE OF CORRECTION

PATENT NO. : 7,144,563 B2  Page 1 of 1
APPLICATION NO. : 10/829660
DATED : December 5, 2006
INVENTOR(S) : Apparao M. Rao, Nicholas W. Gothard and Jay B. Gaillard It is certified that error appears in the above-identified patent and that said Letters Patent is hereby corrected as shown below:

Column 14, line 17 reads "perature is between about 65° C. and about 850° C." should read --perature is between about 650° C. and about 850° C.--

Signed and Sealed this

Tenth Day of April, 2007

JON W. DUDAS
*Director of the United States Patent and Trademark Office*